US011643180B2

(12) United States Patent
Ueno

(10) Patent No.: US 11,643,180 B2
(45) Date of Patent: May 9, 2023

(54) SHIP SPEED CONTROL DEVICE, SHIP SPEED CONTROLLING METHOD, AND SHIP SPEED CONTROL PROGRAM

(71) Applicant: FURUNO ELECTRIC CO., LTD., Nishinomiya (JP)

(72) Inventor: Hideki Ueno, Takarazuka (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 329 days.

(21) Appl. No.: 17/015,801

(22) Filed: Sep. 9, 2020

(65) Prior Publication Data
US 2021/0078687 A1 Mar. 18, 2021

(30) Foreign Application Priority Data

Sep. 13, 2019 (JP) .............................. JP2019-166739

(51) Int. Cl.
G05D 13/64 (2006.01)
B63H 21/21 (2006.01)
B63B 79/40 (2020.01)

(52) U.S. Cl.
CPC .............. B63H 21/21 (2013.01); B63B 79/40 (2020.01); *B63H 2021/216* (2013.01)

(58) Field of Classification Search
CPC ...... B63B 79/40; B63B 79/10; G05D 1/0206; G05D 1/0061; G05D 13/64; B63H 2025/045; B63H 21/213; B63H 2021/216; B63H 21/21; B63H 21/22
See application file for complete search history.

(56) References Cited

U.S. PATENT DOCUMENTS

| 8,340,847 | B2 | 12/2012 | Sako et al. |
| 8,943,988 | B1 | 2/2015 | Guglielmo et al. |
| 9,377,780 | B1 | 6/2016 | Arbuckle et al. |
| 9,718,527 | B2* | 8/2017 | Ito .......................... B63B 34/60 |
| 9,950,777 | B2* | 4/2018 | Kishimoto ........... G05D 1/0206 |
| 10,167,798 | B1 | 1/2019 | Van Camp et al. |
| 10,723,431 | B1 | 7/2020 | Przybyl et al. |
| 11,188,080 | B2 | 11/2021 | Akuzawa et al. |
| 2004/0181322 | A1 | 9/2004 | Okuyama |

(Continued)

FOREIGN PATENT DOCUMENTS

| EP | 2 246 765 A1 | 11/2010 |
| EP | 3 214 523 A1 | 9/2017 |

(Continued)

OTHER PUBLICATIONS

Das et al., Diesel Engine Control and Protection Monitoring using PID Controller, 2019, IEEE, p. 1-6 (Year: 2019).*

(Continued)

*Primary Examiner* — McDieunel Marc
(74) *Attorney, Agent, or Firm* — Studebaker & Brackett PC

(57) ABSTRACT

A ship speed control device is provided, which includes a calculator and a throttle command value setter. The calculator calculates a throttle calculation value based on a difference between an actual ship speed and a target ship speed. The throttle command value setter sets, when the actual ship speed is below a first threshold determined based on a given throttle upper limit and the throttle calculation value is at or above the throttle upper limit, a throttle command value to the throttle upper limit.

20 Claims, 6 Drawing Sheets

(56) References Cited

U.S. PATENT DOCUMENTS

| | | | | |
|---|---|---|---|---|
| 2004/0242091 | A1* | 12/2004 | Okuyama | B63H 21/21 |
| | | | | 440/86 |
| 2007/0134092 | A1 | 6/2007 | Rosenkranz et al. | |
| 2007/0293103 | A1 | 12/2007 | Kinoshita et al. | |
| 2010/0121505 | A1 | 5/2010 | Yamazaki et al. | |
| 2012/0010766 | A1 | 1/2012 | Sako et al. | |
| 2015/0089427 | A1 | 3/2015 | Akuzawa | |
| 2016/0229511 | A1 | 8/2016 | Kishimoto et al. | |
| 2016/0280351 | A1* | 9/2016 | Ito | B63B 34/60 |
| 2017/0137103 | A1* | 5/2017 | Ito | B63H 20/00 |
| 2017/0277189 | A1 | 9/2017 | Johnson et al. | |
| 2017/0285645 | A1 | 10/2017 | Nakagawa | |
| 2017/0349258 | A1 | 12/2017 | Kishimoto et al. | |
| 2017/0365175 | A1 | 12/2017 | Harnett | |
| 2018/0015994 | A1 | 1/2018 | Kishimoto et al. | |
| 2018/0334234 | A1 | 11/2018 | Namba et al. | |
| 2019/0039708 | A1 | 2/2019 | Hayes et al. | |
| 2019/0084662 | A1 | 3/2019 | Wong et al. | |
| 2020/0407034 | A1* | 12/2020 | Ueno | G05D 1/0061 |
| 2021/0078690 | A1* | 3/2021 | Ueno | G05D 1/0208 |

FOREIGN PATENT DOCUMENTS

| | | |
|---|---|---|
| JP | S58-099198 U | 7/1983 |
| JP | H08-198185 A | 8/1996 |
| JP | H10-109693 A | 4/1998 |
| JP | 2004-034805 A | 2/2004 |
| JP | 2004-142538 A | 5/2004 |
| JP | 2007-022422 A | 2/2007 |
| JP | 2008-155764 A | 7/2008 |
| JP | 2009-025860 A | 2/2009 |
| JP | 2011-235839 A | 11/2011 |
| JP | 2013-151241 A | 8/2013 |
| JP | 2015-066979 A | 4/2015 |
| JP | 2016-144971 A | 8/2016 |
| JP | 2017-088111 A | 5/2017 |
| JP | 2017-88119 A | 5/2017 |
| JP | 2017-178242 A | 10/2017 |
| JP | 2018-192976 A | 12/2018 |
| KR | 10-2014-0080106 A | 6/2014 |
| KR | 10-2018-0044087 A | 5/2018 |
| WO | 2016/104030 A1 | 6/2016 |
| WO | 2016/104031 A1 | 6/2016 |
| WO | 2016/109832 A2 | 7/2016 |
| WO | 2018/100748 A1 | 6/2018 |
| WO | 2018/228670 A1 | 12/2018 |

OTHER PUBLICATIONS

Petratos et al., A novel robust MPC based aircraft auto-throttle for performing 4D contract flights, 2013, IEEE, p. 1-6 (Year: 2013).*
Schbley et al., Application of a modified error governor to electronic throttle control, 2017, IEEE, p. 815-819 (Year: 2017).*
Lee et al., Assessment of Energy Savings With Variable Speed Drives in Ship's Cooling Pumps, 2015, IEEE, p. 1288-1298 (Year: 2015).*
Haifeng et al., The Speed Control of Marine Main Engine, 2014, IEEE, p. 770-773 (Year: 2017).*
Jiang et al., An integrated control simulation system of ship motion and main propulsion, 2014, IEEE, p. 865-869 (Year: 2014).*
Oh et al., System Identification ofa Model Ship Using a Mechatronic System, 2009, IEEE, p. 316-320 (Year: 2009).*
Micheau et al., Engine speed limiter for watercrafts, 2006, IEEE, p. 579-585 (Year: 2006).*
The extended European search report issued by the European Patent Office dated Dec. 17, 2020, which corresponds to European Patent Application No. 20195841.0-1202 and is related to U.S. Appl. No. 17/015,801.
The extended European search report issued by the European Patent Office dated Feb. 26, 2021, which corresponds to European Patent Application No. 20195840.2-1015 and is related to U.S. Appl. No. 17/015,801.
Communication pursuant to Article 94(3) EPC issued by the European Patent Office dated Dec. 23, 2021, which corresponds to European Patent Application No. 20 195 841.0-1202 and is related to U.S. Appl. No. 17/015,801.
The extended European search report issued by the European Patent Office dated Nov. 30, 2020, which corresponds to European Patent Application No. 20181370.6-1015 and is related to U.S. Appl. No. 17/015,801.
The extended European search report issued by the European Patent Office dated Dec. 10, 2020, which corresponds to European Patent Application No. 20182258.2-1015 and is related to U.S. Appl. No. 17/015,801.
An Office Action mailed by the United States Patent and Trademark Office dated Jan. 17, 2023, which corresponds to U.S. Appl. No. 16/909,906 and is related to the present application.
An Office Action mailed by the United States Patent and Trademark Office dated Mar. 3, 2023, which corresponds to U.S. Appl. No. 17/018,521, and is related to the present application.
An Office Action mailed by the United States Patent and Trademark Office dated Mar. 16, 2023, which corresponds to U.S. Appl. No. 16/909,978, and is related to the present application.

* cited by examiner

SHIP SPEED CONTROL DEVICE, SHIP SPEED CONTROLLING METHOD, AND SHIP SPEED CONTROL PROGRAM

CROSS-REFERENCE TO RELATED APPLICATION(S)

The application claims priority under 35 U.S.C. § 119 to Japanese Patent Application No. 2019-166739, which was filed on Sep. 13, 2019, the entire disclosure of which is hereby incorporated by reference.

TECHNICAL FIELD

The present disclosure relates to an art for automatically controlling a ship speed.

BACKGROUND

As a conventional technology, JP2017-088119A discloses a method of controlling a ship speed.

However, when the ship speed is controlled automatically by using the conventional ship speed control method as disclosed in JP2017-088119A, the ship speed changes suddenly if a ship speed setting is increased too high while an actual ship speed is low.

SUMMARY

Therefore, one purpose of the present disclosure is to control an actual ship speed from low to high so that the ship speed automatically follows a high ship speed setting, while avoiding a sudden speed change.

A ship speed control device according to one aspect of the present disclosure includes a calculator and a throttle command value setter. The calculator calculates a throttle calculation value based on a difference between an actual ship speed and a target ship speed. The throttle command value setter sets, when the actual ship speed is below a first threshold determined based on a given throttle upper limit and the throttle calculation value is at or above the throttle upper limit, the throttle command value to be the throttle upper limit. An AP controller according to one aspect of the present disclosure includes processing circuitry. The processing circuitry calculates a throttle calculation value based on a difference between an actual ship speed and a target ship speed, and sets a throttle command value to the throttle upper limit when the actual ship speed is below a first threshold determined based on a given throttle upper limit and the throttle calculation value is at or above the throttle upper limit.

According to this configuration, when the actual ship speed is controlled from low to high, a throttle opening can be avoided from being sharply increased.

According to the present disclosure, the actual ship speed can be controlled from low to high so as to automatically follow a high ship speed setting without a sudden speed change.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
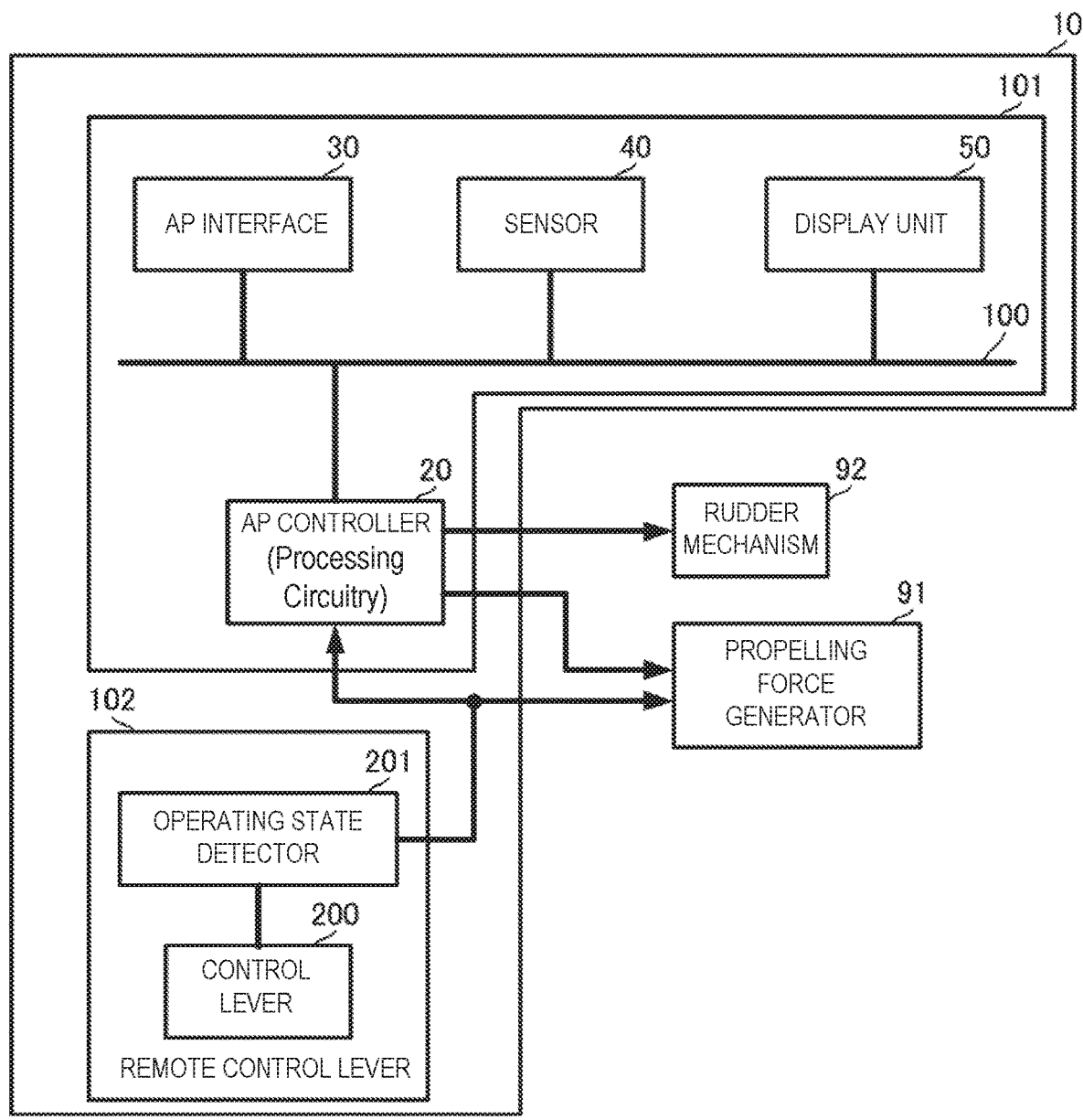
FIG. 1 is a functional block diagram illustrating a configuration of a hull control system including a ship speed control device according to one embodiment of the present disclosure.
Figure 2:
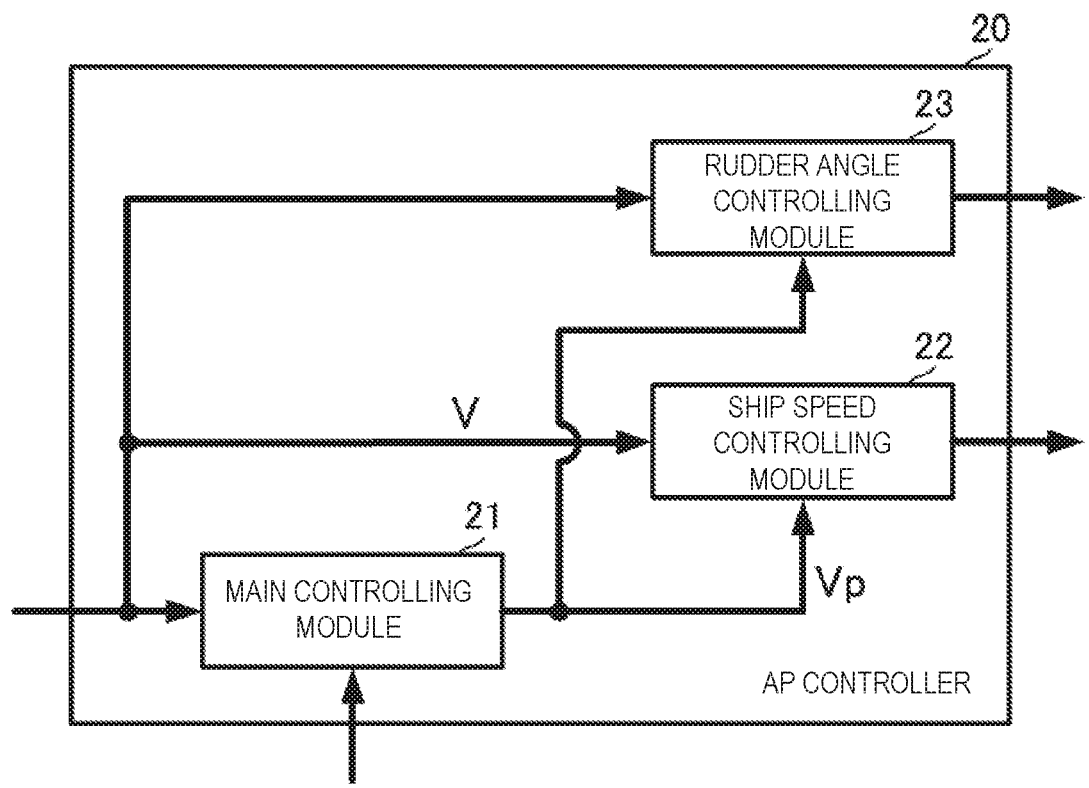
FIG. 2 is a functional block diagram illustrating a configuration of an autopilot controller (AP controller)

A device, method, and program for controlling a ship speed according to one embodiment of the present disclosure are described with reference to the accompanying drawings. FIG. 1 is a functional block diagram illustrating a configuration of a hull control system including the ship speed control device according to the embodiment of the present disclosure. FIG. 2 is a functional block diagram illustrating a configuration of an autopilot controller (AP controller).

Configuration of Hull Control Device 10

As illustrated in FIG. 1, a hull control device 10 may include a device body 101 and a remote control lever 102. The device body 101 and the remote control lever 102 may be provided to a body of a ship to be controlled by autopilot control (automatic navigation control). Note that the present disclosure may be applied to ships which typically travel on water or sea which are referred to as surface ships, and may also be applied to other types of ships including boats, dinghies, watercrafts, and vessels. The hull control device 10 may be connected to a propelling force generator 91 and a rudder mechanism 92. Note that the propelling force generator 91 and the rudder mechanism 92 may be provided, for example, to various kinds of propelling devices, such as an outboard motor, an inboard motor, and an inboard/outboard drive. The hull may include one propelling force generator 91 and one rudder mechanism 92. That is, the hull control device 10 of the embodiment may be provided to a single-propeller single-rudder ship.

Configuration of Device Body 101

The device body 101 may include an AP controller (processing circuitry) 20, an AP interface 30, a sensor 40, and a display unit 50.

The AP controller 20, the AP interface 30, the sensor 40, and the display unit 50 may be connected with each other via a data communication network 100 for a ship. The AP controller 20, the remote control lever 102, and the propelling force generator 91 may be connected, for example, via a propelling force communication network (e.g., CAN). The AP controller 20 and the rudder mechanism 92 may be connected via analog voltage or data communications.

The AP controller 20 may be comprised of, for example, a processor, such as a CPU, and a memory. The memory may store a program executed by the AP controller 20. Moreover, the memory may be used during the calculation by the CPU. As illustrated in FIG. 2, the AP controller 20 may include a main controlling module 21, a ship speed controlling module 22, and a rudder angle controlling module 23.

The main controlling module 21 may generally perform main control of the autopilot control (automatic navigation control) by the AP controller 20 for a ship speed and a rudder angle. For example, the main controlling module 21 may accept an autopilot control setting made via the AP interface 30. The main controlling module 21 may analyze contents of the setting, and control a processing timing, etc. of the ship speed controlling module 22 and the rudder angle controlling module 23, so as to realize the autopilot control setting. The main controlling module 21 may also monitor an operating state from an operating state detector 201 of the remote control lever 102. The main controlling module 21 may also perform autopilot control by considering the monitoring results.

The main controlling module 21 may provide the ship speed setting from the AP interface 30 to the ship speed controlling module 22. The main controlling module 21 may also provide a direction setting from the AP interface 30 to the rudder angle controlling module 23. Here, the ship speed setting may refer to a ship speed (velocity) which the ship is caused to follow finally in the autopilot control. The direction setting may refer to a hull direction which the ship is caused to follow finally in the autopilot control. Note that the ship speed setting may be directly acquired by the ship speed controlling module 22, and the direction setting may be directly acquired by the rudder angle controlling module 23.

The ship speed controlling module 22 may generally calculate a target ship speed based on the ship speed setting. The target ship speed may refer to a ship speed set so that an actual ship speed becomes close to the ship speed setting during the automatic ship speed control. The ship speed controlling module 22 may perform PID control based on a difference between the target ship speed and the actual ship speed as an input to calculate a control ship speed, which is a ship speed calculated so that the actual ship speed becomes close to the target ship speed. Based on the control ship speed, the ship speed controlling module 22 may calculate a throttle calculation value. The ship speed controlling module 22 may set a throttle command value R using various conditions (described later), such as an actual ship speed V, a ship speed setting Vp, a target ship speed Vt, and a throttle calculation value Re. The ship speed controlling module 22 may output the throttle command value R to the propelling force generator 91. The propelling force generator 91 may control a propelling force in accordance with the throttle command value R. The ship speed controlling module 22 may be referred to as a "ship speed control device" of the present disclosure.

The rudder angle controlling module 23 may generally calculate a target direction based on the direction setting. The target direction may refer to a direction set so that the hull direction becomes close to the direction setting during the automatic rudder angle control. The rudder angle controlling module 23 may perform PID control based on an angle of deviation between the target direction and the hull direction as an input to set a rudder angle command. The rudder angle controlling module 23 may output the rudder angle command to the rudder mechanism 92. The rudder mechanism 92 may control the rudder angle in accordance with the rudder angle command.

The AP interface 30 may be implemented by, for example, a touch panel, and a physical button or switch. The AP interface 30 may accept a setting operation relevant to the autopilot control. The AP interface 30 may output the content of the setting to the AP controller 20.

The sensor 40 may measure a speed (actual ship speed V) and a hull direction (bow direction and stern direction) of the ship (hull) provided with the hull control device 10. The sensor 40 may be implemented by, for example, a positioning sensor utilizing positioning signals of a GNSS (e.g., GPS), an inertia sensor (e.g., an acceleration sensor, an angular velocity sensor), and a magnetic sensor.

The display unit 50 may be implemented by, for example, a liquid crystal panel. The display unit 50 may display information relevant to a normal autopilot navigation inputted from the AP controller 20. Note that, although the display unit 50 can be omitted, the display unit 50 may be provided, and the existence of the display unit 50 may allow a user to easily grasp a controlling state and/or a cruising state of the autopilot.

Configuration of Remote Control Lever 102

The remote control lever 102 may include a control lever 200 and the operating state detector 201.

The control lever 200 may accept an operation of a user during a manual navigation. The operating state detector 201 may be implemented by a sensor, etc. The operating state detector 201 may detect the operating state of the control lever 200, and output the detected operating state (angle) of the control lever to the propelling force generator 91. During the manual navigation, the propelling force generator 91 may generate a propelling force depending on the operating state. The operating state may be monitored by the AP controller 20 as described above. For example, the AP controller 20 may perform an initial control of the autopilot control with reference to the operating state, when switching from the manual operation to the autopilot control.

Configuration of Ship Speed Controlling Module 22

Figure 3:
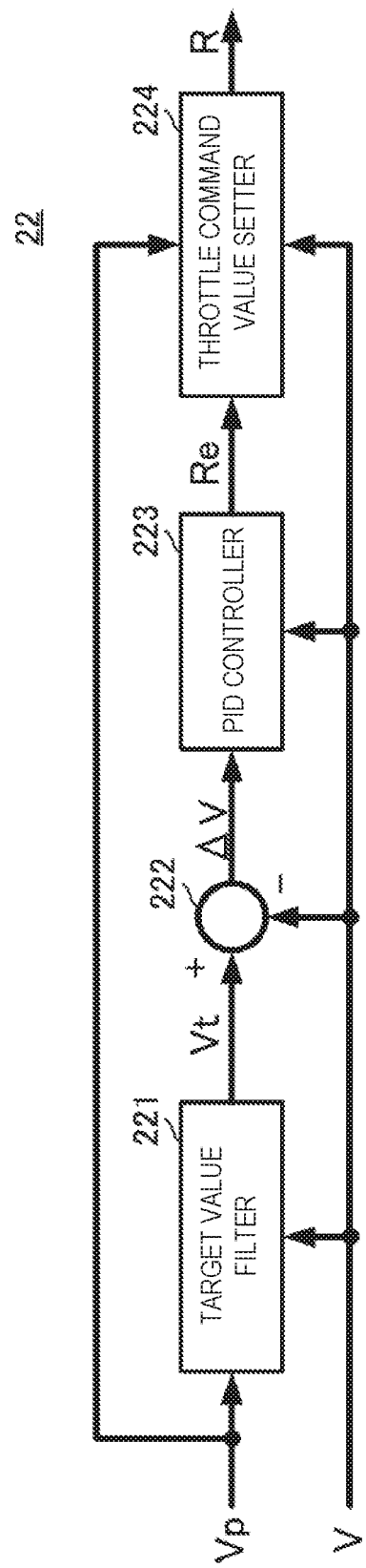
FIG. 3 is a functional block diagram illustrating a configuration of a ship speed controlling module.

FIG. 3 is a functional block diagram illustrating a configuration of the ship speed controlling module 22. As illustrated in FIG. 3, the ship speed controlling module 22 may include a target value filter 221, a difference calculator 222, a PID controller 223, and a throttle command value setter 224.

The target value filter 221 may output the target ship speed Vt based on the ship speed setting Vp as an input. The target ship speed Vt may be set to be between the actual ship speed V at the start of the automatic ship speed control and the ship speed setting Vp, so that the actual ship speed V at the start of the automatic ship speed control gradually approaches the ship speed setting Vp.

The difference calculator 222 may subtract the actual ship speed V from the target ship speed Vt, and output a speed deviation $\Delta V$.

The PID controller 223 may perform calculation of known PID (proportional-integral-differential) control based on the speed deviation $\Delta V$ as an input to calculate a control speed Ve. The PID controller 223 may then calculate the throttle calculation value Re based on the control speed Ve. The relationship between the control speed Ve and the throttle calculation value Re may be determined uniquely. The PID controller 223 may be referred to as a "calculator" of the present disclosure.

The throttle command value setter 224 may set the throttle command value R based on the throttle calculation value Re. The throttle command value setter 224 may output the throttle command value R to the propelling force generator 91.

Note that the propelling force generator 91 may generate a propelling force depending on the throttle command value R. The ship may travel in response to the propelling force, and the speed of the ship (actual ship speed V) may be measured by the sensor 40. The actual ship speed V measured by the sensor 40 may be fed back to the difference calculator 222.

Then the PID control by the feedback of the actual ship speed V described above may be repeated, thereby, the actual ship speed V approaches to and then suitably follows the ship speed setting Vp.

In such control and processing, the ship speed controlling module 22 may perform the following processing.

The ship speed controlling module 22 may have settings of a throttle upper limit Rs, a threshold THs, and a threshold THr. The throttle upper limit Rs may be determined based on a throttle command value (corresponding to a throttle opening) capable of preventing passengers or the ship from experiencing a sudden change of speed, even if the throttle opening is sharply increased when the ship speed is 0 (i.e., the ship is stopped). That is, the throttle upper limit Rs may be set as a value above which the passengers or ship will experience a sudden change of speed.

The throttle upper limit Rs can be adjusted based on the ship's specification, loading weight, resistance to disturbance, etc. The throttle upper limit Rs can also be set according to an estimated throttle command value at which the passengers experience a sudden change of speed, based on the passengers' experiences or previous cruising conditions detected by a sensor.

The threshold THs may be a value obtained by converting the throttle upper limit Rs into the ship speed. The threshold THr may be a value obtained by multiplying the threshold THs by a coefficient k (k<1). The coefficient k is about 0.6, for example. The coefficient k can suitably be set by taking into consideration the approaching rate of the ship speed to the ship speed setting, etc. The threshold THr may be referred to as a "first threshold," and the threshold THs may be referred to as a "second threshold" of the present disclosure.

When Ship Speed Setting Vp<Threshold THs (When Ship Speed Setting Vp is Low)

If the ship speed setting Vp is below the threshold THs, the ship speed controlling module 22 may set the throttle command value R at or below the throttle upper limit Rs.

When Ship Speed Setting Vp>Threshold THs (When Ship Speed Setting Vp is High)

The throttle command value setter 224 of the ship speed controlling module 22 may compare the actual ship speed V and the threshold THr. If the actual ship speed V is below the threshold THr (V<THr), the throttle command value setter 224 may compare the throttle calculation value Re and the throttle upper limit Rs. If the throttle calculation value Re is at or above the throttle upper limit Rs, the throttle command value setter 224 may set the throttle upper limit Rs to the throttle command value R. On the other hand, if the throttle calculation value Re is below the throttle upper limit Rs, the throttle command value setter 224 may set the throttle calculation value Re as the throttle command value R.

The target value filter 221 of the ship speed controlling module 22 may compare the calculated target ship speed Vt and the threshold THs. If the calculated target ship speed Vt is at or above the threshold THs, the target value filter 221 may restrict the target ship speed Vt to be outputted to the difference calculator 222 to the threshold THs. On the other hand, if the calculated target ship speed Vt is below the threshold THs, the target value filter 221 may output the calculated target ship speed Vt to the difference calculator 222.

If the actual ship speed V is below the threshold THr, the PID controller 223 of the ship speed controlling module 22 may increase an integral gain. On the other hand, if the actual ship speed V is at or above the threshold THr, the PID controller 223 may restore the integral gain.

Figure 4A:
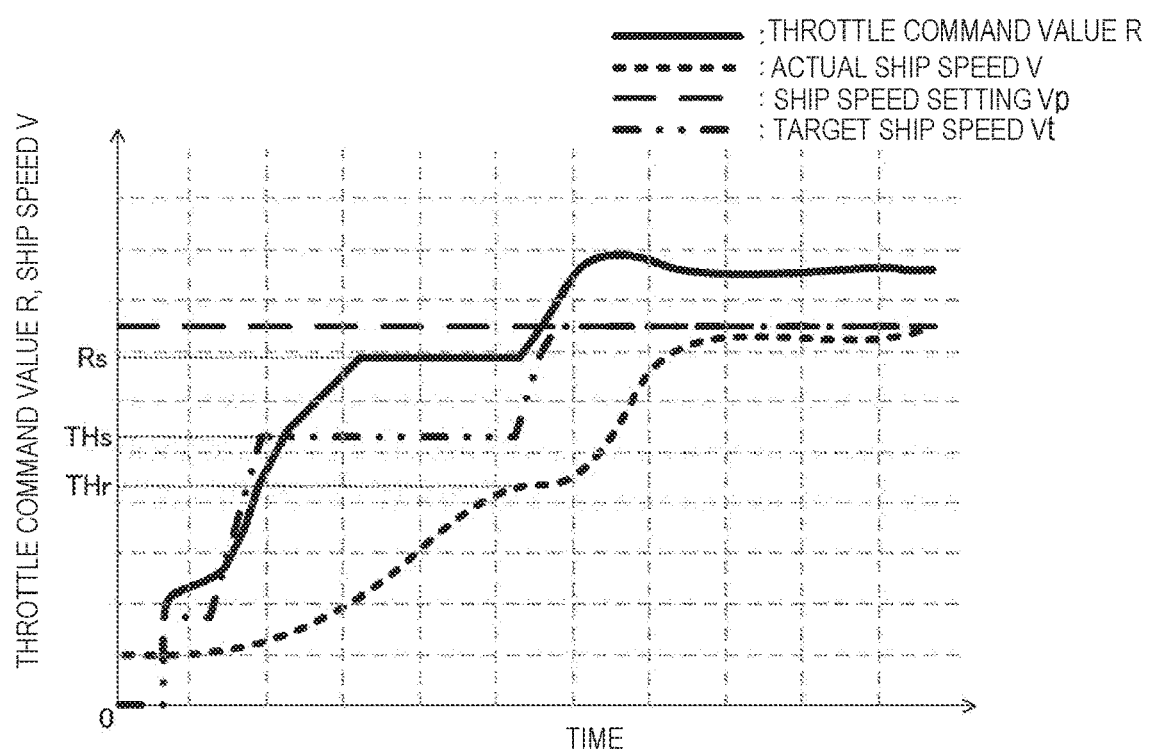
FIG. 4A is a graph illustrating time transitions of an actual ship speed V, a target ship speed Vt, and a throttle command value R, and a ship speed setting Vp in a control and processing according to the present disclosure.
Figure 4B:
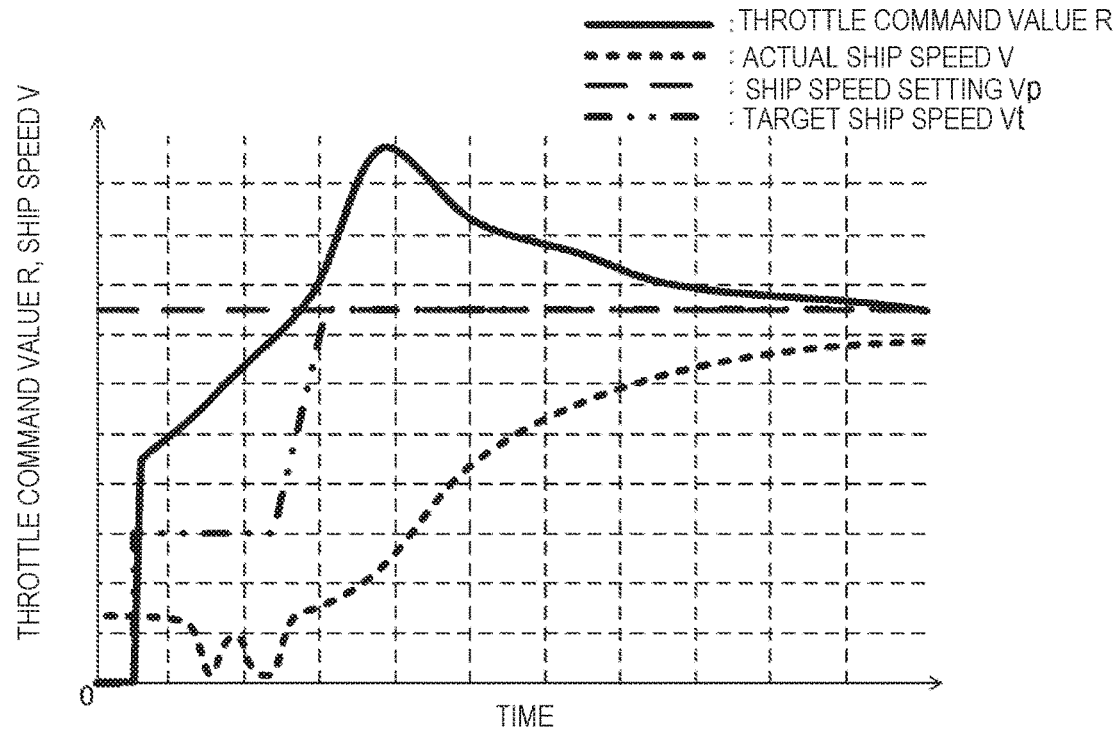
FIG. 4B is a graph illustrating time transitions of an actual ship speed V, a target ship speed Vt, and a throttle command value R, and a ship speed setting Vp in a conventional control and processing.

By performing such control and processing, the actual ship speed V and the throttle command value R may transit as illustrated in FIG. 4A. FIG. 4A is a graph illustrating time transitions of an actual ship speed V, a target ship speed Vt, and a throttle command value R, and a ship speed setting Vp in control and processing according to the present disclosure. FIG. 4B is a graph illustrating, for comparison, time transitions of an actual ship speed V, a target ship speed Vt, and a throttle command value R, and a ship speed setting Vp in a conventional control and processing. In the conventional control and processing, the throttle command value R and the target ship speed Vt are not restricted.

In the embodiment illustrated in FIGS. 4A and 4B, the ship speed setting Vp may be higher than the threshold THs. Therefore, the control and processing in a case with a high ship speed setting Vp as described above may be performed.

When Configuration of Present Disclosure is Applied

As illustrated in FIG. 4A, if the automatic ship speed control is started when the actual ship speed V is low (substantially zero), the throttle command value R may gradually increase. The actual ship speed V may also increase accordingly over time. Here, when the configuration of the present disclosure is applied, the throttle command value R may be restricted at or below the throttle upper limit Rs until the actual ship speed V reaches the threshold THr. In this case, the target ship speed Vt may also be restricted at or below the threshold THs. Thus, it can be prevented that the throttle command value R and the throttle opening corresponding thereto become excessively high. Therefore, a sudden speed change at the time of acceleration can be avoided. That is, the hull control device 10 can control the actual ship speed from low to high so as to automatically follow a high ship speed setting without a sudden speed change.

Note that, when the actual ship speed V approximates the ship speed setting Vp, the restriction of the target ship speed Vt and the throttle command value R may be cancelled. Therefore, the actual ship speed V may stably follow the ship speed setting Vp.

Moreover, by increasing the integral gain of the PID control, a high increasing rate of the actual ship speed V can be achieved even in a period with the restriction of the throttle command value R. That is, the ship speed can rise promptly. Note that, although the adjustment of the integral gain can be omitted, the adjustment of the integral gain may be performed.

When Conventional Configuration is Applied

On the other hand, when the configuration of the present disclosure is not applied, the throttle command value R and the throttle opening may become excessively high at the time of acceleration from the low speed to the high speed, which causes a large difference from the change in the actual ship speed V, as illustrated in FIG. 4B. As a result, for example, the information which the user sees has a divergence from the information which the user hears, which makes the user uneasy.

Ship Speed Control Method

Figure 5:
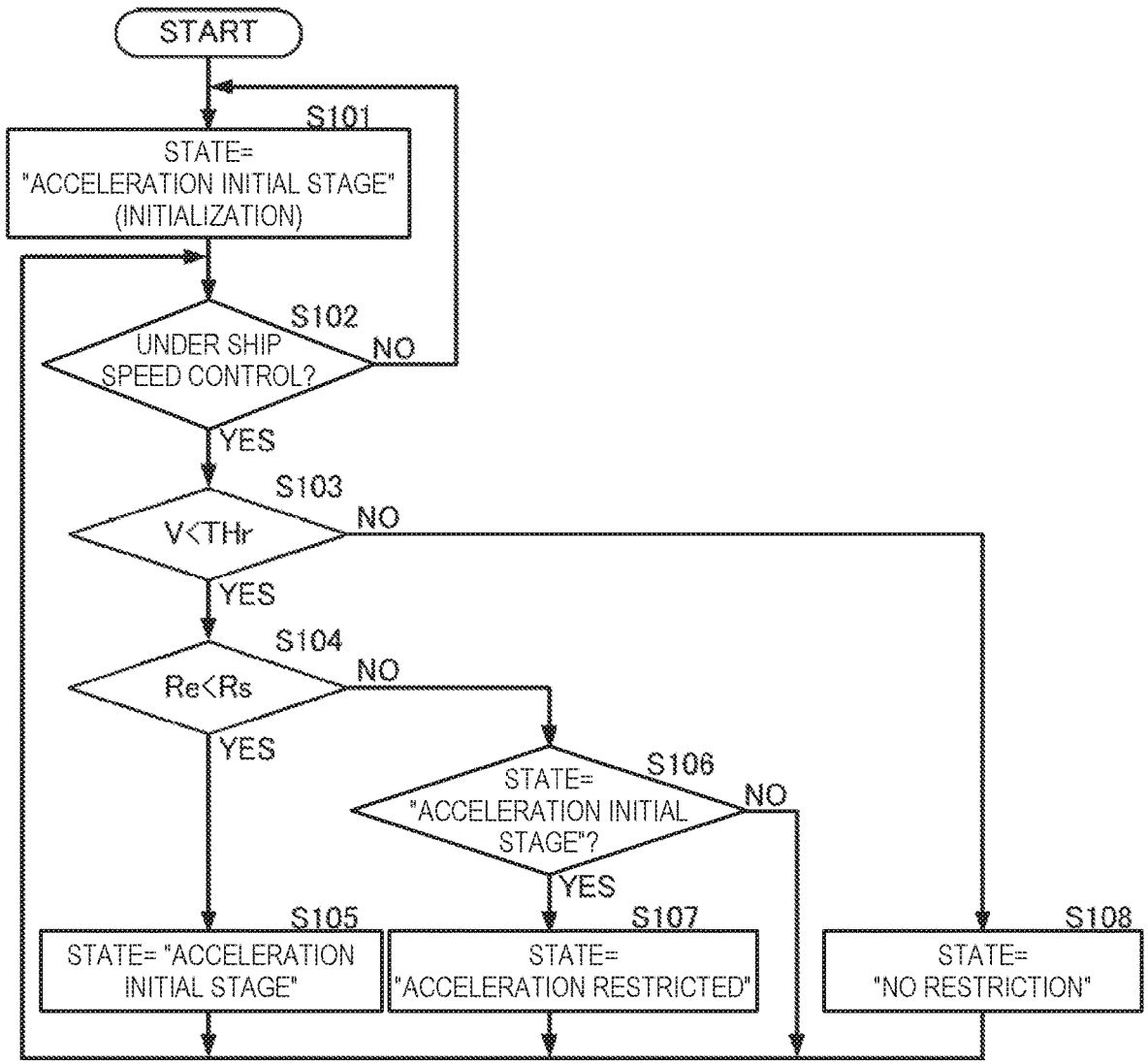
FIG. 5 is a flowchart illustrating a state selection processing in a ship speed control method according to the present disclosure.
Figure 6:
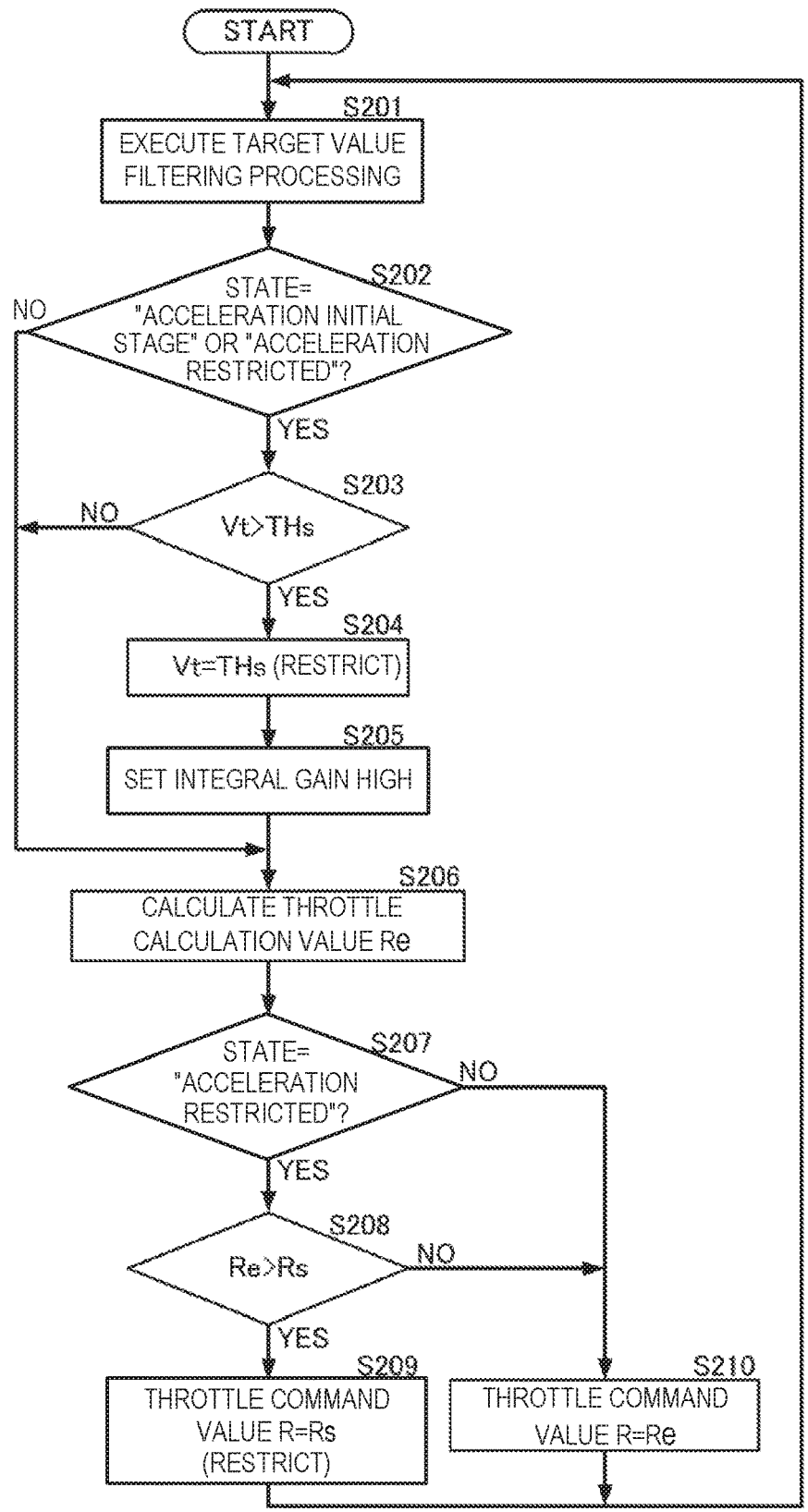
FIG. 6 is a flowchart illustrating a processing of setting a target ship speed and a throttle command value in the ship speed control method according to the present disclosure.

In the above description, the ship speed control is implemented by a plurality of functional blocks. However, it is also possible to implement the ship speed controlling module 22 by a processor (e.g., CPU) configured to execute the ship speed control program. In such a case, the ship speed controlling module 22 may execute the following processing. FIG. 5 is a flowchart illustrating a state selection processing in the ship speed control method according to the present disclosure. FIG. 6 is a flowchart illustrating processing of setting the target ship speed and the throttle command value in the ship speed control method according to the present disclosure.

Selection of State

As illustrated in FIG. 5, the ship speed controlling module 22 may select the state="initial stage of acceleration," which means the initial stage of changing from the low speed or the stopped state to the high speed in the automatic ship speed control (Step S101). If the ship speed is not automatically controlled (Step S102: NO), the ship speed controlling module 22 may continue selecting the state="initial stage of acceleration."

If the ship speed is automatically controlled (Step S102: YES), the ship speed controlling module 22 may compare the actual ship speed V and the threshold THr (Step S103). If the actual ship speed V is below the threshold THr (Step S103: YES), the ship speed controlling module 22 may compare the throttle calculation value Re and the throttle upper limit Rs (Step S104). If the actual ship speed V is at or above the threshold THr (Step S103: NO), the ship speed controlling module 22 may select the state="no restriction" (Step S108), and return to Step S102.

If the throttle calculation value Re is below the throttle upper limit Rs (Step S104: YES), the ship speed controlling module 22 may select the state="initial stage of acceleration" (Step S105), and return to Step S102. When the ship speed controlling module 22 detects that the throttle calculation value Re is at or above the throttle upper limit Rs (Step 104: NO), it then detects whether the state at Step S104 is "initial stage of acceleration" (Step S106). If the state is "initial stage of acceleration" (Step 106: YES), the ship speed controlling module 22 may transit to the state="acceleration restricted" (Step S107), and return to Step S102. If the state is not "initial stage of acceleration" (Step 106: NO), the ship speed controlling module 22 may return to Step S102 without transition of the state.

Setting of Target Ship Speed Vt and Throttle Command Value R

As illustrated in FIG. 6, the ship speed controlling module 22 may execute a target value filtering processing (Step S201). The ship speed controlling module 22 may determine whether the state="initial stage of acceleration" or "acceleration restricted" (Step S202). If the state="initial stage of acceleration" or "acceleration restricted" is not satisfied (Step 202: NO), the ship speed controlling module 22 may transit to Step S206.

If the state="initial stage of acceleration" or "acceleration restricted" (Step S202: YES), the ship speed controlling module 22 may compare the target ship speed Vt and the threshold THs calculated in the target value filtering processing (Step S203).

If the calculated target ship speed Vt is above the threshold THs (Step 203: YES), the ship speed controlling module 22 may restrict the target ship speed Vt for use in the calculation of the speed deviation $\Delta V$ to the threshold THs (Step S204). The ship speed controlling module 22 then may increase the integral gain of the PID control (Step S205). If the calculated target ship speed Vt is at or below the threshold THs (Step S203: NO), the ship speed controlling module 22 may transit to Step 206.

The ship speed controlling module 22 may perform the PID control based on the speed deviation $\Delta V$, which is the difference between the target ship speed Vt and the actual ship speed V, to calculate the throttle calculation value Re (Step S206).

If the state="acceleration restricted" is not satisfied (Step S207: NO), the ship speed controlling module 22 may set the throttle calculation value Re as the throttle command value R (Step S210), and then return to Step S201.

If the state="acceleration restricted" (Step S207: YES), the ship speed controlling module 22 may compare the throttle calculation value Re and the throttle upper limit Rs (Step S208). If the throttle calculation value Re is above the throttle upper limit Rs (Step S208: YES), the ship speed controlling module 22 may restrict the throttle command value R by the throttle upper limit Rs (Step S209), and then return to Step S201. If the throttle calculation value Re is at or below the throttle upper limit Rs (Step S208: NO), the ship speed controlling module 22 may set the throttle calculation value Re to the throttle command value R (Step S210), and then return to Step S201.

By executing such a processing, the ship speed controlling module 22 can control the actual ship speed from low to high so as to automatically follow a high ship speed setting without a sudden speed change.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An AP controller, comprising:
processing circuitry configured
to calculate a throttle calculation value based on a difference between an actual ship speed and a target ship speed; and
to set a throttle command value to the throttle upper limit when the actual ship speed is below a first threshold determined based on a given throttle upper limit and the throttle calculation value is at or above the throttle upper limit.

2. The AP controller of claim 1, wherein
the processing circuitry is further configured
to cancel the restriction of the throttle command value using the throttle upper limit; and
to set the throttle calculation value as the throttle command value, when the actual ship speed is at or above the first threshold.

3. The AP controller of claim 1, wherein
the processing circuitry is further configured to restrict the throttle command value using the throttle upper limit when a ship speed setting, from which the target ship speed is calculated and that is a final ship speed during an automatic ship speed control, is above the first threshold and is at or above a second threshold that is determined based on the throttle upper limit.

4. The AP controller of claim 3, wherein
the processing circuitry is further configured to set a throttle command value at or below the throttle upper limit corresponding to the difference when the ship speed setting is below the second threshold.

5. The AP controller of claim 3, wherein
the processing circuitry is further configured
to calculate the target ship speed based on the ship speed setting; and
to set the target ship speed to the second threshold when a target ship speed set by the processing circuitry is above the second threshold and the actual ship speed is below the first threshold.

6. The AP controller of claim 5, wherein
the processing circuitry is further configured
to calculate the throttle calculation value by a PID control; and
to set a higher integral gain of the PID control during a period when the actual ship speed is below the first threshold and the target ship speed is set to the second threshold.

7. A method of controlling a ship speed, comprising:
calculating, by processing circuitry, a throttle calculation value based on a difference between an actual ship speed and a target ship speed; and
setting, by the processing circuitry, a throttle command value to the throttle upper limit when the actual ship speed is below a first threshold determined based on a given throttle upper limit and the throttle calculation value is at or above the throttle upper limit.

8. The method of claim 7, further comprising
cancelling, by the processing circuitry, the restriction of the throttle command value using the throttle upper limit; and
setting, by the processing circuitry, the throttle calculation value as the throttle command value
when the actual ship speed is at or above the first threshold.

9. The method of claim 7, further comprising
restricting, by the processing circuitry, the throttle command value using the throttle upper limit when a ship speed setting, from which the target ship speed is calculated and that is a final ship speed during an automatic ship speed control, is above the first threshold and is at or above a second threshold that is determined based on the throttle upper limit.

10. The method of claim 9, further comprising
setting, by the processing circuitry, the throttle command value at or below the throttle upper limit corresponding to the difference when the ship speed setting is below the second threshold.

11. The method of claim 9, further comprising:
calculating, by the processing circuitry, the target ship speed by a target value filter, based on the ship speed setting; and
setting, by the processing circuitry, the target ship speed to the second threshold when a target ship speed set by the target value filter is above the second threshold and the actual ship speed is below the first threshold.

12. The method of claim 11, further comprising:
calculating, by the processing circuitry, the throttle calculation value by a PID control; and
setting, by the processing circuitry, a higher integral gain of the PID control during a period when the actual ship speed is below the first threshold and the target ship speed is set to the second threshold.

13. A non-transitory computer-readable recording medium storing a program causing a processor of a ship speed control device to execute processing, the processor configured to control operation of the ship speed control device, the processing comprising:
calculating a throttle calculation value based on a difference between an actual ship speed and a target ship speed; and
setting a throttle command value to the throttle upper limit when the actual ship speed is below a first threshold determined based on a given throttle upper limit and the throttle calculation value is at or above the throttle upper limit.

14. The recording medium of claim 13, the processing further comprising
cancelling the restriction of the throttle command value using the throttle upper limit; and
setting the throttle calculation value as the throttle command value
when the actual ship speed is at or above the first threshold.

15. The recording medium of claim 13, the processing further comprising
restricting the throttle command value using the throttle upper limit when a ship speed setting, from which the target ship speed is calculated and that is a final ship speed during an automatic ship speed control, is above the first threshold and is at or above a second threshold that is determined based on the throttle upper limit.

16. The recording medium of claim 15, the processing further comprising
setting the throttle command value at or below the throttle upper limit corresponding to the difference when the ship speed setting is below the second threshold.

17. The recording medium of claim 15, the processing further comprising:
calculating the target ship speed by a target value filter, based on the ship speed setting; and
setting the target ship speed to the second threshold when a target ship speed set by the target value filter is above the second threshold and the actual ship speed is below the first threshold.

18. The recording medium of claim 17, the processing further comprising:
   calculating the throttle calculation value by a PID control; and
   setting a higher integral gain of the PID control during a period when the actual ship speed is below the first threshold and the target ship speed is set to the second threshold.

19. The AP controller of claim 2, wherein
   the processing circuitry is further configured to restrict the throttle command value using the throttle upper limit when a ship speed setting, from which the target ship speed is calculated and that is a final ship speed during an automatic ship speed control, is above the first threshold and is at or above a second threshold that is determined based on the throttle upper limit.

20. The method of claim 8, further comprising
   restricting, by the processing circuitry, the throttle command value using the throttle upper limit when a ship speed setting, from which the target ship speed is calculated and that is a final ship speed during an automatic ship speed control, is above the first threshold and is at or above a second threshold that is determined based on the throttle upper limit.

* * * * *